2,875,168

PROCESS OF EXTRUDING VINYLIDENE CHLORIDE RESIN PLASTICIZED WITH AN ETHYLENE GLYCOL DIBENZOATE

William Mayo Smith, Jr., Cuyahoga Falls, and Chris E. Best, Franklin Township, Summit County, Ohio, assignors to The Firestone Tire & Rubber Company, Akron, Ohio, a corporation of Ohio No Drawing. Application September 23, 1954
Serial No. 458,014

3 Claims. (Cl. 260—31.4)

This invention relates to the plasticizing of crystalline homopolymers and copolymers of vinylidene chloride.

These crystalline materials include both polymers of vinylidene chloride and copolymers thereof with not more than substantially 15 percent of other unsaturated compounds copolymerizable therewith. The copolymers contain at least substantially 85 percent of vinylidene chloride. Suitable comonomers for the copolymerization include, for example, vinyl chloride, vinyl fluoride, vinyl acetate, styrene, acrylic and methacrylic esters such as methylmethacrylate, ethylacrylate, and the like, acrylonitrile, methacrylonitrile, vinyl-type ethers and ketones such as methylvinyl ether, methylvinyl ketone and related compounds such as methylisopropenyl ketone, and the like. For a more complete list of compounds known to copolymerize with vinyl chloride to produce resins which can be plasticized as herein described see Krczil, "Kurzes Handbuch der Polymerisation-stechnik," vol. II "Mehrstoffpolymerization," Edwards Bros., Inc., p. 739, the items indented under "vinylidene chlorid."

Such resins are characterized by crystalline behavior, i. e., they fuse sharply to form relatively fluid melts which may be extruded, quenched and oriented to form strong films and filaments of crystalline character. A syndrome of this crystalline habit is the recalcitrance of these resins to compounding: The macromolecules of these resins prefer contact with each other and tend to reject any foreign substances such as plasticizers and the like. It is therefore very difficult to provide suitable compounding agents for these materials, and specifically to provide mutually compatible plasticizing agents therefor.

The problem of providing plasticizers for these crystalline resins is complicated not only by the fact that they tend to reject and spew the majority of conventional plasticizers, but the resins are extruded as hot melts and the temperature of the melts is such as to cause many conventional resin-compounding ingredients to tend to decompose or react with other compounding ingredients present.

The plasticizers of this invention have the following formula

in which $n$ is a whole number not greater than 2.

It will be understood that the plasticizers of this invention need not be pure compounds of the above formula, but may be mixtures of compounds each individually having that formula.

The plasticizers of this invention are produced by the esterification of benzoic acid with ethylene and diethylene glycols. These plasticizers are excellent and efficient, and have excellent light stability and good heat stability as well as good spew resistance. They are non-toxic and non-allergenic.

The plasticizers may be incorporated with the resins to the extent of three percent and more, up to and not more than ten percent based on the total weight of the resin. The derivatives of the lower-molecular-weight polyglycols may be used in somewhat higher percentages than the derivatives of the higher-molecular-weight polyglycols without showing objectionable spew. Less than the aforesaid three percent may be employed in admixture with other plasticizers. Higher percentages than those indicated in the foregoing are apt to spew from the resin, particularly at elevated temperatures.

The claimed plasticizes were separately incorporated into a resin copolymer of 85 percent vinylidene chloride and 15 percent vinyl chloride according to the recipe given as follows:

|  | Parts by weight |
|---|---|
| Copolymer of vinylidene chloride and vinyl chloride | 100 |
| Glycidylphenyl ether | 2 |
| Phenyl salicylate | 2 |
| Plasticizer | 4.5 and 8 |

The different compositions were tested for heat and light stability, and also rated for spewing. The methods of testing follow.

HEAT STABILITY

Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was—

(1) Heat for three minutes with steam at 120 lbs./sq. in. and mold pressure of 1000 lbs./sq. in.;
(2) Water cool for two minutes under 1000 lbs./sq. in. mold pressure; and
(3) Eject from the press.

The resultant cylindrical button (1.25 inches in diameter and .125–.188 inch in height) was then cut into sector-shaped specimens which were placed in a forced-draft oven at 180° C. Specimens were removed at intervals of 10, 20 and 30 minutes after placing in the oven, and the behavior of the specimens on the test as a whole was noted and recorded.

LIGHT STABILITY

One gram samples of the compositions to be tested were placed between cellophane sheets and pressed in a flat platen laboratory press under a total of 1000 lbs. at a temperature of 180° C., yielding a plaque approximately 6 to 8 mils thick. The plaques were tested according to the method of ASTM test D620–45T under a sunlamp for 240 hours and the results are recorded in column A.

Plaques were also tested in a weatherometer for 100 hours, and 200 hours, the reports of the tests for the respective durations being reported in Columns B and C. The weatherometer was a standard X–1–A machine, using a Corex D filter and operating without the sprays.

The ratings for heat and light stability were determined subjectively by the operator and recorded as "excellent" (E), "good" (G), "fair" (F), and "poor" (P).

SPEW RATING

A plaque of the compounded resin was pressed between cellophane sheets in a Carver press at 180° C., using approximately 1.5 grams of resin, 10 second preheat, and 15 seconds with the minimum pressure (pressure indicator just off zero). The plaque was quenched in cold water immediately and an approximately ⅜ inch wide strip was cut from the plaque, the cellophane removed, and the strip oriented to its limit.

Test strips were placed in glassine bags under mild pressure so that contact of the strips with the bag was assured. Any exudation of plasticizer could then be noted as an oily streak on the glassine. Tests were carried out at room temperature and at 50° C., the latter condition tending to accentuate any migration of plasticizer. Little or no spew was noted at room temperature after as long as 18 days, whereas with dioctyl phthalate definite spew occurred after one day.

The results of spew tests carried out at 50° C. for 18 days are given in Table I. "OK" designates that no spew was noticeable on the glassine at the end of the test period.

*Table I*

| Plasticizer | Heat Stability | Light Stability | | | Spew |
|---|---|---|---|---|---|
| | | A | B | C | |
| Ethylene glycol dibenzoate (4.5 pt.) | F | E | E | E | OK. |
| Ethylene glycol dibenzoate (8.0 pt.) | F | E | E | E | OK. |
| Diethylene glycol dibenzoate (4.5 pt.) | G | E | E | E | OK. |
| Diethylene glycol dibenzoate (8.0 pt.) | G | E | E | E | OK. |

Extrusion tests were made on material compounded with the plasticizers of this invention together with glycidylphenyl salicylate, as in the foregoing table. The filaments were extruded from the plasticized molten material very satisfactorily and showed good light stability in the weatherometer. The oriented filaments did not spew.

The plasticizers of this invention are commercially available. They may be made by esterification of the glycols with the acids or acid chlorides.

It is not essential that light stabilizers and heat stabilizers be employed as in the foregoing example. Instead of using phenyl salicylate, alkyl-substituted phenyl salicylates may be employed, as is well known in the art. Other heat stabilizers may be used, although generally an epoxy compound will be employed.

What we claim is:

1. In the process of extruding and orienting a resin selected from the group consisting of homopolymers of vinylidene chloride and copolymers thereof with up to 15 percent by weight, based on the weight of said copolymers, of other monomer copolymerized therewith, the improvement which comprises including as a plasticizer in the molten resin a substantial amount not in excess of 10 percent by weight, based on the weight of the resin, of a compound having the formula $$C_6H_5\text{---}CO\text{---}O\text{---}(C_2H_4O)_n\text{---}CO\text{---}C_6H_5$$

in which $n$ is a whole number not greater than 2.

2. In the process of extruding and orienting a resin selected from the group consisting of homopolymers of vinylidene chloride and copolymers thereof with up to 15 percent by weight, based on the weight of said copolymers, of other monomer copolymerized therewith, the improvement which comprises including as a plasticizer in the molten resin a substantial amount not in excess of 10 percent by weight, based on the weight of the resin, of ethylene glycol dibenzoate.

3. In the process of extruding and orienting a resin selected from the group consisting of homopolymers of vinylidene chloride and copolymers thereof with up to 15 percent by weight, based on the weight of said copolymers, of other monomer copolymerized therewith, the improvement which comprises including as a plasticizer in the molten resin a substantial amount not in excess of 10 percent by weight, based on the weight of the resin, of diethylene glycol dibenzoate.

References Cited in the file of this patent

UNITED STATES PATENTS

| 2,637,714 | Emerson | May 5, 1953 |
| 2,654,723 | Greene | Oct. 6, 1953 |